United States Patent [19]
Pfleger et al.

[11] 4,122,248
[45] Oct. 24, 1978

[54] MANUFACTURE OF HOMOGENEOUS ETHYLENE/TERT-BUTYL ACRYLATE/ACRYLIC ACID TERPOLYMERS

[75] Inventors: Klaus Pfleger; Klaus Böettcher; Wieland Zacher; Dirk Juza, all of Wesseling, Germany

[73] Assignee: BASF Aktiengesellschaft, Ludwigshafen, Germany

[21] Appl. No.: 737,719

[22] Filed: Nov. 1, 1976

Related U.S. Application Data

[63] Continuation-in-part of Ser. No. 687,869, May 19, 1976, abandoned.

[30] Foreign Application Priority Data

May 31, 1975 [DE] Fed. Rep. of Germany ....... 2524274

[51] Int. Cl.$^2$ ............................ C08F 8/00; C08F 8/06
[52] U.S. Cl. .................................... 528/481; 526/317; 526/329; 526/914; 528/501

[58] Field of Search ................ 528/481, 501; 526/317, 526/914

[56] References Cited
U.S. PATENT DOCUMENTS 3,132,120  5/1964  Graham et al. ..................... 200/78.5
3,736,305  5/1973  Kinkel et al. ...................... 260/80.78

Primary Examiner—Stanford M. Levin
Attorney, Agent, or Firm—Keil, Thompson & Shurtleff

[57] ABSTRACT

A process for the manufacture of copolymers of ethylene with tert-butyl acrylate and acrylic acid at from 200° to 350° C under pressures above 800 atmospheres using mean residence times of up to at most 100 seconds, in which the reaction mixture obtained from the polymerization is kept for from 2 to 10 minutes at from 200° to 250° C under a pressure of not more than 500 atmospheres. Terpolymers are obtained which may be used as hot-melt adhesives in the form of thin and extremely homogeneous films.

1 Claim, No Drawings

MANUFACTURE OF HOMOGENEOUS ETHYLENE/TERT-BUTYL ACRYLATE/ACRYLIC ACID TERPOLYMERS

This application is a continuation in part of our U.S. Pat. application Ser. No. 687,869, filed May 19, 1976, now abandoned.

The invention relates to a process for the manufacture of copolymers of ethylene which contain, as copolymerized units, more than 60 per cent by weight of ethylene, from 1 to 20 per cent by weight of tert.-butyl acrylate and/or tert.-butyl methacrylate and from 1 to 10 per cent by weight of acrylic acid and/or methacrylic acid, by copolymerization of ethylene and tert.-butyl acrylate and/or tert.-butyl methacrylate at from 200° to 350° C at pressures of from 800 to 3000 atmospheres using mean residence times of from 40 to 100 seconds.

French Pat. No. 1,596,991 discloses a process for the manufacture of ethylene copolymers which contain, as copolymerized units, a predominant amount of ethylene, an alkene-carboxylic acid of 3 to 12 carbon atoms, minor amounts of alkenes of 3 to 8 carbon atoms and, optionally, esters of alkenecarboxylic acids of 3 to 12 carbon atoms with secondary alkanols of 3 to 8 carbon atoms or tertiary alkanols of 4 to 8 carbon atoms, and/or further monomers which are copolymerizable with ethylene. The copolymers are manufactured by copolymerizing monomer mixtures of ethylene, an ester of an alkene-carboxylic acid of 3 to 12 carbon atoms with a secondary alkanol of 3 to 8 carbon atoms or a tertiary alkanol of 4 to 8 carbon atoms and, optionally, further monomers which are copolymerizable with ethylene, at pressures of from 100 to 8,000 atmospheres, and at from 110° to 350° C using catalytic amounts of free radical initiators. The temperature in the reactor must be at least sufficiently high that the secondary or tertiary ester groups in the polymer pyrolyze partially or completely. Free carboxylic acid groups are then obtained in the polymer, an alkene being eliminated.

However, the homogeneity of the products manufactured by the said process is unsatisfactory. This phenomenon is particularly objectionable if the polymers are used as hot-melt adhesives, because very thin films are required for this purpose. Irregularities in the hot-melt adhesive film (holes, specks) are a considerable disadvantage because they reduce the adhesion at the interface between the hot-melt adhesive and the material to be bonded (eg. polyethylene or metals). If the bonded areas are subjected to substantial stress, the materials bonded to one another can separate, for example where the film contains specks. Inhomogeneous films of these polymers give considerable technical difficulties when used in the manufacture of laminates.

A further disadvantage of the conventional process is that the copolymer content and melt index of the products obtained show considerable variation.

It is an object of the present invention to modify the process described above so that homogeneous ethylene copolymers are obtained in which the copolymer content and melt index show little variation. It is a further object that the ethylene copolymers should be capable of conversion to very thin films which do not exhibit objectionable irregularities.

We have found that these objects are achieved, according to the invention, by passing the reaction mixture, obtained after the polymerization, into a zone in which the pressure is from 1 to 500, preferably from 50 to 500, atmospheres and the temperature is from 200° to 250° C, the mean residence time of the reaction mixture in the zone being from 2 to 10 minutes.

In a preferred embodiment of the process, the temperature of the reaction mixture in the high pressure isolation zone, which is from 200° to 250° C, is not allowed to vary by more than ±2° C.

According to the invention, substantially more homogeneous ethylene copolymers are obtained than by the conventional process.

The ethylene employed for the polymerization should be at least 98 per cent pure. tert.-Butyl acrylate and tert.-butyl methacrylate are commercially available. The ethylene copolymers, which contain, as copolymerized units, a predominant amount of ethylene, from 1 to 10 per cent by weight of acrylic acid and/or methacrylic acid and from 1 to 20 per cent by weight of tert.-butyl acrylate and/or tert.-butyl methacrylate, are manufactured in conventional continuous high-pressure polymerization systems, particularly advantageously incontinuous tubular reactors, cf. Ullmanns Encyklopadie der technischen Chemie, 3rd Edition, Urban and Schwarzenberg, Berlin-Munich 1963, Volume 14, page 139. The polymerization of the monomer mixture is carried out at pressures of from 800 to 3000 atmospheres, but the polymerization can also be carried out at pressures of up to 8,000 atmospheres. The polymerization temperature is from 200° to 350° C and preferably from 280° to 330° C. The mean residence time, in the reaction zone, of the mixture to be polymerized is very short, being from 40 to 100 seconds. This mean residence time is defined by the ratio of the volume of the apparatus to the mean volume of product passing through the volume of the apparatus per unit time.

Ethylene is copolymerized with tert.-butyl acrylate, tert.-butyl methacrylate or a mixture of both acrylates in the presence of free radical initiators. By free radical polymerization initiators are to be understood catalysts which can also be used for the high pressure homopolymerization of ethylene. For example, oxygen, advantageously in amounts of from 10 to 200 molar ppm, based on the ethylene to be polymerized, may be used. Peroxides and other compounds which form free radicals may also be used, as well as mixtures of peroxides having different decomposition points, hydroperoxides, and mixtures of oxygen and peroxides and/or hydroperoxides. Examples of peroxides and hydroperoxides are tert.-butyl peroxypivalate, di-tert.-butyl peroxide, tert.-butyl hydroperoxide, tert.-butyl perbenzoate, p-methane hydroperoxide and dilauroyl peroxide. Compounds such as azoisobutyrodinitrile are also included under free radical polymerization initiators.

In a special embodiment of the process according to the invention, conventional polymerization regulators are used. By means of these it is possible to vary the melt index of the ethylene copolymers produced. Examples of suitable regulators are hydrogen, ketones, alcohols, ethers and normal and branched hydrocarbons; propylene, methyl ethyl ketone and propionaldehyde are used preferentially. In general, from 0.2 to 5 mole per cent of the polymerization regulators, based on the ethylene to be polymerized, are employed.

The copolymerization of the ethylene with tert.-butyl acrylate or tert.-butyl methacrylate can also be carried out in the presence of other compounds which are copolymerizable with ethylene. Examples of suitable comonomers are vinyl esters derived from saturated carboxylic acids of 3 to 8 carbon atoms, other acrylic acid esters and methacrylic acid esters, fumaric acid esters and maleic acid esters.

The polymerization is in general carried out in the absence of a solvent. The small amounts of an inert solvent, eg. benzene, petroleum or other inert solvents, in which the polymerization initiators are dissolved, are negligible compared to the other materials employed. If oxygen is used as the polymerization initiator, no solvent whatsoever is necessary.

At the end of the polymerization reaction, the temperature of the reaction mixture is in general above 285° C. The reaction mixture is then passed into a cooling zone where it is cooled to from 200° to 250° C. This step may either be carried out under the pressure at which the polymerization is carried out, or after letting down the reaction mixture, at pressures below 500 atmospheres. Immediately after the cooling treatment, the reaction mixture is fed into a high pressure product isolation zone in which it is kept at a temperature of from 200° to 250° C which preferably varies by at most 35 2° C, and where it undergoes partial pyrolysis. This converts the copolymerized tert.-butyl acrylate units or tert.-butyl methacrylate units partially into acrylic acid units or methacrylic acid units, with elimination of isobutylene. The temperature of the reaction mixture in the pyrolysis zone preferably does not vary by more than ±2° C. If the temperature variation in this zone is greater, the pyrolysis of the tert.-butyl acrylate or tert.-butyl methacrylate units becomes uncontrolled and inhomogeneous products are obtained. The mean residence time of the reaction mixture in the pyrolysis zone is from 2 to 10 minutes. The mean residence time is the time for which the copolymer formed remains in the reactor zone in which a pressure below 500 atmospheres and a temperature of from 200° to 250° C prevails. The mean residence time is defined by the ratio of the volume of the apparatus to the mean volume of product which has passed through the volume of the apparatus per unit time. The pressure in the pyrolysis zone is preferably from 50 to 500 atmospheres. However, the pyrolysis can also be carried out at lower pressures, i.e., at from 1 to 50 atmospheres. According to the invention, homogeneous copolymers are obtained, which contain, as copolymerized units, more than 60 per cent by weight of ethylene, from 1 to 10 per cent by weight of acrylic acid and/or methacrylic acid and from 1 to 20 per cent by weight of tert.-butyl acrylate and/or tert.-butyl methacrylate. The ethylene copolymers manufactured by the process of the invention are homogeneous and are used, above all, as hot-melt adhesives, eg. for metals, ceramics, paper, textiles, plastics, wood, glass and the like. For example, in contrast to polyethylene, the copolymers can easily be colored or printed with most conventional dyes. When blended with polyolefins, the copolymers give mixtures which can also be printed and dyed. Since the ethylene copolymers manufactured according to the invention are homogeneous, they can easily be converted to thin, homogeneous films which are employed as hot-melt adhesive films. The melt index of the ethylene copolymers manufactured according to the invention is from 0.1 to 50, preferably from 1 to 20, g/10 min. (determined according to ASTM D 1238-65 T at from 190° C under a load of 2.16 kg).

The Examples which follow illustrate the invention. The polymerization apparatus is a tubular reactor as conventionally employed for continuous high-pressure polymerization. Tubular reactors are polymerization vessels whose length is from 10,000 to 40,000 times the diameter of the circular cross-section of the tube. The reaction tube is surrounded by a jacketing tube which contains a heat transfer medium. The reaction tube is divided into two zones which can be heated independently of one another, the first zone extending over two-fifths of the length of the tube and the second over the remaining three-fifths of the length of the reaction tube. At the end of the reaction tube there is a valve which serves both to regulate the pressure in the polymerization space and also to discharge the reaction product. This valve is followed by a jacketed tube in which the reaction mixture which has left the reaction tube is cooled to a temperature of from 200 to a maximum of 250° C. The pressure in this zone is from 1 to 500, preferably from 50 to 500, atmospheres. At this temperature, the reaction mixture is then passed into a high pressure product isolation zone or high pressure separator, in which the pressure is approximately the same as in the preceding jacketed tube and in which the temperature is from 200° to 250° C, which temperature varies by at most 35 2° C. In this zone, the polymer obtained in the reaction tube is separated from the nonpolymerized monomers. The mean residence time of the reaction mixture, obtained from the polymerization, after having been cooled to from 200° to 250° C, is from 2 to 10 minutes. From the high pressure product isolation zone the polymer, which still contains small amounts of monomer, is passed to a low pressure product separator at pressures of less than 10 atmospheres, and from this latter separator the polymer is fed to an extruder. The nonpolymerized monomers are recycled to the reactor, via a conventional separator system for removing materials which are liquid under normal conditions. The amount of these components removed from the circulation system is only sufficient to ensure a stationary state when the reactor is operating continuously.

In the Examples, parts are by weight.

EXAMPLE 1

A mixture which consists of 10,000 parts of ethylene, 270 parts of tert.-butyl acrylate and 14 molar ppm of oxygen, based on ethylene, is compressed to 2,200 atmospheres and fed to the reactor described above. The heat transfer medium in zones I and II of the reactor jacket is kept at 200° C during the polymerization. As a result of the exothermicity of the reaction, the reaction mixture reaches peak temperatures of 300° C in both the reaction zones. The mean residence time of the reaction mixture in the reactor is 50 seconds.

The polymer is cooled to 250° C under a pressure of 300 atmospheres and is left under a pressure of 270 atmospheres at 250° C in the high pressure separator which is downstream from the reactor. The temperature in the high pressure separator is kept constant so that the maximum deviation is ±2° C. The mean residence time of the ethylene copolymer in the high pressure separator is 10 minutes. 1,850 parts of an ethylene copolymer which contains 4.7 per cent by weight of tert.-butyl acrylate and 5.8 per cent by weight of acrylic acid, as copolymerized units, are obtained. The ethylene copolymer has a melt index (190° C/2.16 kg) of 7.1 g/10 mins and a density (according to DIN 53,479/7.2) of 0.9273 g/cm$^3$, and exhibits good homogeneity and gives films having good properties.

EXAMPLE 2

The procedure described in Example 1 is followed but the polymerization is carried out under a pressure of 2,300 atmospheres. As a result of the exothermicity of the reaction, the reaction mixture reaches peak temperatures of 315° C. The polymer is cooled to 210° C under a pressure of 300 atmospheres and is then transferred directly to the high pressure separator in which it is kept for 8 minutes at a pressure of 280 atmospheres and at 210° C, with a maximum deviation of ±2° C. 1,900 parts of an ethylene copolymer containing 7.8 per cent by weight of tert.-butyl acrylate and 3.0 per cent by weight of acrylic acid, as copolymerized units, are obtained. The ethylene copolymer has a melt index (190° C/2.16 kg) of 7.4 g/10 mins and a density of 0.9269 g/cm³, and exhibits good homogeneity and gives films having good properties.

EXAMPLE 3

The procedure described in Example 2 is followed but the polymer is pyrolyzed at 230° C instead of 210° C. The temperature of the polymer in the pyrolysis zone is kept constant and deviates by at most ±2° C. 1,900 parts of an ethylene copolymer containing 6.6 per cent by weight of tert.-butyl acrylate and 4.1 per cent by weight of acrylic acid are obtained. The ethylene copolymer has a melt index (190° C/2.16 kg) of 8.0 g/10 mins and a density (according to DIN 53,479/7.2) of 0.9271 g/cm³, and exhibits good homogeneity and gives films having good properties.

COMPARATIVE EXAMPLE 1

A mixture of 10,000 parts of ethylene, 270 parts of tert.-butyl acrylate and 14 molar ppm of oxygen, based on ethylene, is polymerized by the method described in Example 1, under a pressure of 2,200 atmospheres. The polymerization conditions are the same as those stated in Example 1. In modification of Example 1, the polymer is not cooled and instead is transferred directly to a product separator in which it remains for 60 seconds at 310° C. The temperature fluctuates by about ±10° C. An ethylene copolymer which is inhomogeneous and unsuitable for the manufacture of thin hot-melt adhesive films is obtained. Various samples of the product which were taken show that the composition varies; eg., from 7.0 to 9.0 per cent by weight of acrylic acid, and a melt index (190° C/2.16 kg) of from 4.5 to 8.8 g/10 mins, are found. The copolymerized tert.-butyl acrylate is pyrolyzed completely under the stated conditions.

COMPARATIVE EXAMPLE 2

A mixture which consists of 10,000 parts of ethylene and 300 parts of tert.-butyl acrylate and is compressed to 2,300 atmospheres is fed to the reactor described in Example 1. The polymerization is carried out in the presence of 30 ppm of oxygen. The temperature of the heat transfer medium is 180° C in zone I and 200° C in zone II. As a result of the exothermicity of the reaction, the reaction mixture reaches a maximum temperature of 270° C in both zones. The residence time during polymerization is 60 seconds. The reaction mixture is then left for 50 seconds in the product separator at 320° C under a pressure of 280 atmospheres. 1,900 parts of an ethylene copolymer which contains from 7.5 to 9.6 per cent by weight of acrylic acid as copolymerized units are obtained. The copolymerized tert.-butyl acrylate is pyrolyzed completely under the above conditions. The ethylene copolymer obtained is very inhomogeneous and is unsuitable for the manufacture of hot-melt adhesive films.

The homogeneity of the ethylene copolymers, referred to in the Examples, was determined on 40μ thick films. The films were prepared by extruding the ethylene copolymer, obtained in the various Examples, at a material temperature of 150° C. The draw-off speed is 6.5 m/minute, the frost line 250 mm and the blow-up ratio is 1:2. The extruded tubular film passes through an optical instrument which continuously measures inhomogeneities in the film. The measurement covers a 5 cm zone of the lay-flat film which passes through it and which is 23 cm wide. Each inhomogeneity in the film (specks, clots, fish-eyes) generates an electrical pulse. The number of pulses, which corresponds to the number of specks, is counted over a period of measurement of, eg., 400 seconds (corresponding to the scanning of a film area of 4.3 m²). By varying the sensitivity setting used for the measurement, the inhomogeneities can be divided into 3 groups, namely I: speck size from 0.5 to 1 mm
II: speck size from 1 to 2 mm
III: speck size greater than 2 mm.

The results are summarized in the Table.

TABLE

| | Melt Index g/10 min. | Density g/cm³ | tert.-butyl acrylate (% by weight) | Acrylic acid (% by weight) | Homogeneity | Number of specks | | |
|---|---|---|---|---|---|---|---|---|
| | | | | | | I (0.5 – 1 mm) | II (1 – 2 mm) | III (>2 mm) |
| Example 1 | 7.1 ± 0.1 | 0.9273 | 4.7 ± 0.2 | 5.8 ± 0.1 | uniformly good | 140 | 4 | 0.2 |
| Example 2 | 7.4 ± 0.1 | 0.9269 | 7.8 ± 0.2 | 3.0 ± 0.1 | uniformly good | 120 | 3 | 0.1 |
| Example 3 | 8.0 ± 0.1 | 0.9271 | 6.6 ± 0.2 | 4.1 ± 0.1 | uniformly good | 125 | 3 | 0.2 |
| Comparative Example 1 | 4.5 – 8.8 | 0.9290 | 0 | 7 – 9 | poor | >1,000 | >100 | 25 |
| Comparative Example 2 | 4.7 – 9.6 | 0.9295 | 0 | 7.5 – 9.6 | poor | >1,000 | >100 | 40 |

In each case, several samples were examined for determining the melt index and the composition of the ethylene copolymers manufactured according to the Examples and Comparative Examples. The Table shows that in the case of the ethylene copolymers manufactured according to the invention the deviations are relatively slight, whilst there are relatively large variations in the case of the Comparative Examples.

We claim:

1. A process for the manufacture of ternary copolymers of ethylene which contain, as copolymerized units, more than 60 percent by weight of ethylene, from 1 to 20 percent by weight of tert.-butyl acrylate and from 1 to 10 percent by weight of acylic acid, by copolymerization of ethylene and tert.-butyl acrylate at from 200° to 350° C at pressures of from 800 to 3,000 atmospheres using mean residence times of from 40 to 100 seconds in the reaction zone, wherein the reaction mixture obtained after the polymerization is passed into a cooling zone to cool the reaction mixture to from 200° to 250° C and then into an isolation zone which is at a pressure from 1 to 500 atmospheres and at a temperature of from 200° to 250° C, which temperature varies by at most ±2° C, the mean residence time of the reaction mixture in the product isolation zone being from 2 to 10 minutes.

* * * * *